US010685768B2

(12) United States Patent
Ishida

(10) Patent No.: US 10,685,768 B2
(45) Date of Patent: Jun. 16, 2020

(54) SOFT MAGNETIC MATERIAL POWDER AND MANUFACTURING METHOD THEREOF, AND MAGNETIC CORE AND MANUFACTURING METHOD THEREOF

(71) Applicant: MURATA MANUFACTURING CO., LTD., Kyoto-fu (JP)

(72) Inventor: Yuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 628 days.

(21) Appl. No.: 15/434,488

(22) Filed: Feb. 16, 2017

(65) Prior Publication Data
US 2017/0162307 A1 Jun. 8, 2017

Related U.S. Application Data

(63) Continuation of application No. PCT/JP2015/075945, filed on Sep. 14, 2015.

(30) Foreign Application Priority Data

Oct. 10, 2014 (JP) ................................. 2014-209308

(51) Int. Cl.
| | | |
|---|---|---|
| *H01F 1/14* | (2006.01) | |
| *H01F 1/147* | (2006.01) | |
| *H01F 1/26* | (2006.01) | |
| *H01F 41/02* | (2006.01) | |
| *B01J 13/02* | (2006.01) | |
| *C09D 133/02* | (2006.01) | |
| *B22F 1/00* | (2006.01) | |
| *C08L 33/02* | (2006.01) | |
| *C09D 7/61* | (2018.01) | |
| *B01J 13/08* | (2006.01) | |
| *C09D 101/32* | (2006.01) | |
| *C09D 129/04* | (2006.01) | |
| *C09D 139/06* | (2006.01) | |
| *C09D 179/02* | (2006.01) | |
| *C09D 189/06* | (2006.01) | |
| *C22C 33/02* | (2006.01) | |
| *B22F 1/02* | (2006.01) | |
| *C08K 3/22* | (2006.01) | |
| *C08K 3/36* | (2006.01) | |

(52) U.S. Cl.
CPC .......... *H01F 1/14733* (2013.01); *B01J 13/02* (2013.01); *B01J 13/08* (2013.01); *B22F 1/0062* (2013.01); *C08L 33/02* (2013.01); *C09D 7/61* (2018.01); *C09D 101/32* (2013.01); *C09D 129/04* (2013.01); *C09D 133/02* (2013.01); *C09D 139/06* (2013.01); *C09D 179/02* (2013.01); *C09D 189/06* (2013.01); *H01F 1/14791* (2013.01); *H01F 1/26* (2013.01); *H01F 41/0206* (2013.01); *H01F 41/0246* (2013.01); *B22F 1/02* (2013.01); *C08K 3/22* (2013.01); *C08K 3/36* (2013.01); *C08K 2003/2227* (2013.01); *C08K 2003/2241* (2013.01); *C08K 2003/2244* (2013.01); *C22C 33/02* (2013.01); *C22C 2202/02* (2013.01)

(58) Field of Classification Search
CPC .... H01F 1/14; H01F 1/14733; H01F 1/14791; H01F 1/0206; H01F 1/0246; C09D 7/61; C09D 101/32; C09D 129/04; C09D 133/02; C09D 139/06; C09D 179/02; C09D 189/06; B01J 13/02; B01J 13/08; B22F 1/0062; B22F 1/02; C08L 33/02; C08K 3/22; C08K 3/36; C08K 2003/2227; C08K 2003/2241; C08K 2003/2244; C22C 33/02; C22C 2202/02
USPC ...................................................... 252/62.54
See application file for complete search history.

(56) References Cited

U.S. PATENT DOCUMENTS

2011/0156850 A1 6/2011 Okamoto et al.

FOREIGN PATENT DOCUMENTS

| CN | 1613919 A | 5/2005 |
|---|---|---|
| CN | 102360665 A | 2/2012 |
| CN | 102385967 A | 3/2012 |
| CN | 102623125 A | 8/2012 |
| CN | 103943296 A | 7/2014 |
| JP | H09-125111 A | 5/1997 |
| JP | 2010-251600 A | 11/2010 |
| JP | 2010-251697 A | 11/2010 |
| JP | 2011-187568 A | 9/2011 |
| JP | 2012-067379 A | 4/2012 |
| JP | 2012-172172 A | 9/2012 |

(Continued)

OTHER PUBLICATIONS

International Search Report issued in PCT/JP2015/075945; dated Dec. 1, 2015.

(Continued)

*Primary Examiner* — Edward M Johnson
(74) *Attorney, Agent, or Firm* — Studebaker & Brackett PC

(57) ABSTRACT

A soft magnetic material powder includes soft magnetic material particles, the soft magnetic material particles each include a core formed from an Fe-based soft magnetic material and an insulating film covering the surface of the core, and the insulating film contains an inorganic oxide and a water soluble polymer. A magnetic core includes soft magnetic material particles and a binder bonding the soft magnetic material particles to each other, the soft magnetic material particles each include a core containing an Fe-based soft magnetic material and an insulating film covering the surface of the core, and the insulating film contains an inorganic oxide and a water soluble polymer.

12 Claims, 2 Drawing Sheets

(56) References Cited

FOREIGN PATENT DOCUMENTS

| | | |
|---|---|---|
| JP | 5189652 B2 | 4/2013 |
| WO | 2010/026984 A1 | 3/2010 |

OTHER PUBLICATIONS

Written Opinion issued in PCT/JP2015/075945; dated Dec. 1, 2015.

Notification of the First Office Action issued by the State Intellectual Property Office of the People's Republic of China dated Oct. 31, 2017, which corresponds to Chinese Patent Application No. 201580021112.8 and is related to U.S. Appl. No. 15/434,488.

An Office Action; "Notification of Reason for Refusal," issued by the Korean Intellectual Property Office dated Jan. 19, 2018, which corresponds to Korean Patent Application No. 10-2016-7035460 and is related to U.S. Appl. No. 15/434,488.

An Office Action; "Notification of Reasons for Rejection," issued by the Japanese Patent Office dated Apr. 3, 2018, which corresponds to Japanese Patent Application No. 2016-552871 and is related to U.S. Appl. No. 15/434,488.

An Office Action mailed by the Chinese Patent Office dated Jul. 3, 2018, which corresponds to Chinese Patent Application No. 201580021112.8 and is related to U.S. Appl. No. 15/434,488 with English language translation.

SOFT MAGNETIC MATERIAL POWDER AND MANUFACTURING METHOD THEREOF, AND MAGNETIC CORE AND MANUFACTURING METHOD THEREOF

CROSS REFERENCE TO RELATED APPLICATIONS

This application claims benefit of priority to Japanese Patent Application 2014-209308 filed Oct. 10, 2014, and to International Patent Application No. PCT/JP2015/075945 filed Sep. 14, 2015, the entire content of which is incorporated herein by reference.

TECHNICAL FIELD

The present disclosure relates to a soft magnetic material powder used for a magnetic core and a manufacturing method thereof. In addition, the present disclosure also relates to a magnetic core using this soft magnetic material powder and a manufacturing method of the magnetic core.

BACKGROUND

In recent years, in concomitance with the reduction in size of electric apparatuses and electronic apparatuses, magnetic cores forming transformers and coils, which are used for the above apparatuses, are required to have characteristics, such as a high magnetic permeability and a low eddy-current loss, at a high frequency. Accordingly, in order to obtain a low eddy-current loss in a high frequency band, the magnetic core is required to have a high electric resistance. As one example of the magnetic core as described above, for example, there has been a powder magnetic core formed in such a way that after a magnetic material is formed into a fine particulate powder, the surface of each particle is covered with an insulating film, and the particles thus treated are processed by compression molding. Compared to the case in which a bulky magnetic material is used, by the powder magnetic core, although the magnetic permeability is decreased, in particular, the electric resistance can be significantly increased, and the eddy-current loss can be remarkably decreased.

Heretofore, a method has been known in which after hydroxides are adsorbed on the surface of pure Fe which is a magnetic material powder by hydrolysis of a metal alkoxide, a sintered body is obtained by pressing the powder thus obtained (for example, see Japanese Unexamined Patent Application Publication No. 09-125111).

In addition, a manufacturing method to obtain a molded powder compact has been known (for example, see Japanese Unexamined Patent Application Publication No. 2012-172172). In this method, after a compaction molding powder in which a metal alkoxide and a mineral containing crystal water are present on surfaces of soft magnetic metal particles and this compaction molding powder are compressed to form a green molded body, this green molded body is annealed to hydrolyze the metal alkoxide and to generate insulating films on the surfaces of the soft magnetic metal particles.

SUMMARY

Technical Problem

The magnetic material powder disclosed in Japanese Unexamined Patent Application Publication No. 09-125111 has a good insulating property, and a thin inorganic film is formed on the surface of the metal magnetic powder. On the other hand, the fluidity in powder compaction molding is inferior, and the magnetic permeability of the powder magnetic core is not increased, and furthermore, there have been problems in that fine cracks are generated in the organic films in powder compaction molding, the electric resistance is decreased in annealing, and the eddy-current loss is increased.

Since the molded powder compact disclosed in Japanese Unexamined Patent Application Publication No. 2012-172172 has a high film strength of the insulating film, no cracks are generated in powder compaction molding, and the electric resistance is not decreased in annealing. However, there have been problems in that since the mineral is added, a thin film cannot be formed, the density of a magnetic powder of the powder magnetic core is not increased, and as a result, the magnetic permeability is not sufficiently increased.

The present disclosure aims to provide a soft magnetic material powder capable of obtaining a magnetic core having a sufficient density, a high magnetic permeability, and also a high electric resistance.

Solution to Problem

A soft magnetic material powder according to the present disclosure comprises:
soft magnetic material particles,
wherein the soft magnetic material particles each include:
a core formed from an Fe-based soft magnetic material; and
an insulating film covering the surface of the core, and
the insulating film contains an inorganic oxide and a water soluble polymer.

Advantageous Effects of Disclosure

According to the soft magnetic material powder of the present disclosure, when a magnetic core is molded therefrom, as the soft magnetic material, a sufficient density can be obtained, and the magnetic permeability of the magnetic core can be increased. In addition, by the insulating film and a binder of each soft magnetic material particle contained in the soft magnetic material powder, a magnetic core having a high electric resistance can be obtained.

DETAILED DESCRIPTION

Figure 1:
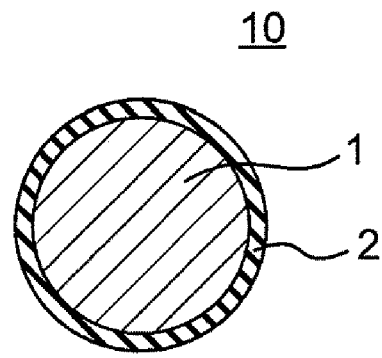
FIG. 1 is an enlarged cross-sectional view showing a fine cross-sectional structure of a soft magnetic material particle contained in a soft magnetic material powder according to Embodiment 1.

A soft magnetic material powder according to a first aspect comprises:

soft magnetic material particles, wherein the soft magnetic material particles each include:

a core formed from an Fe-based soft magnetic material; and an insulating film covering the surface of the core, and the insulating film contains an inorganic oxide and a water soluble polymer.

In a soft magnetic material powder according to a second aspect, the water soluble polymer described in the above first aspect may be at least one selected from the group consisting of a poly(vinyl pyrrolidone), a poly(ethylene imine), a carboxymethyl cellulose, a gelatin, a poly(acrylic acid), a poly (ethylene glycol), and a poly (vinyl alcohol).

In a soft magnetic material powder according to a third aspect, the water soluble polymer described in the above first aspect is a poly(vinyl pyrrolidone) and may be contained in a range of 0.01 to 1 percent by weight.

In a soft magnetic material powder according to a fourth aspect, wherein the inorganic oxide described in any one of the above first to third aspects may be at least one selected from the group consisting of $TiO_2$, $SiO_2$, $Al_2O_3$, and $ZrO$. The inorganic oxide may also be a polysiloxane.

In a soft magnetic material powder according to a fifth aspect, the inorganic oxide described in any one of the above first to third aspects is $SiO_2$ and may be contained in a range of 0.01 to 5 percent by weight.

In a soft magnetic material powder according to a sixth aspect, the Fe-based soft magnetic material described in any one of the above first to fifth aspects may be at least one selected from the group consisting of Fe, FeNi, FeCo, FeSi, FeSiCr, FeSiAl, and FeSiBCr.

A method for manufacturing a soft magnetic material powder according to a seventh aspect comprises:

dispersing an Fe-based soft magnetic material in a solvent; and adding a metal alkoxide and a water soluble polymer to the solvent to hydrolyze the metal alkoxide and to form insulating films each containing a metal oxide, which is a hydrolysate of the metal alkoxide, and the water soluble polymer on surfaces of soft magnetic material particles which form the Fe-based soft magnetic material powder, so that an insulating treatment is performed on the soft magnetic material particles.

A magnetic core according to an eighth aspect comprises the soft magnetic material powder according to any one of the above first to sixth aspects.

A magnetic core according to a ninth aspect is a magnetic core which comprises:

soft magnetic material particles; and a binder which bonds the soft magnetic material particles to each other, wherein the soft magnetic material particles each include:

a core containing an Fe-based soft magnetic material; and an insulating film covering the surface of the core, and the insulating film contains an inorganic oxide and a water soluble polymer.

A magnetic core according to a tenth aspect is a magnetic core which comprises:

soft magnetic material particles; and a binder which bonds the soft magnetic material particles to each other, wherein the soft magnetic material particles each include:

a core formed from an Fe-based soft magnetic material; and a Si-containing insulating film covering the surface of the core, the Fe-based soft magnetic material includes Fe and Cr, and the insulating film contains an inorganic oxide in which the amount of Si is larger than that of Cr.

A method for manufacturing a magnetic core according to an eleventh aspect comprises:

mixing the soft magnetic material powder according to any one of the above first to sixth aspects and a thermosetting resin functioning as a binder to form a mixture; and heat-curing the mixture to obtain a magnetic core.

A method for manufacturing a magnetic core according to a twelfth aspect comprises:

mixing the soft magnetic material powder according to any one of the above first to sixth aspects and a thermosetting resin functioning as a binder to form a mixture; and after the thermosetting resin is cured by heating the mixture, performing an annealing treatment to obtain a magnetic core.

An electronic component according to a thirteenth aspect comprises the magnetic core according to any one of the above eighth to the tenth aspects.

Hereinafter, a soft magnetic material powder and a manufacturing method thereof and a magnetic core and a manufacturing method thereof according to embodiments will be described with reference to the attached drawings. In addition, in the drawings, substantially the same members are designated by the same reference numeral.

(Embodiment 1)

Soft Magnetic Material Powder

FIG. 1 is a cross-sectional view showing a cross-sectional structure of a soft magnetic material particle 10 included in a soft magnetic material powder according to Embodiment 1. This soft magnetic material particle 10 has a core containing an Fe-based soft magnetic material and an insulating film 2 covering the surface of the core 1. The insulating film 2 contains an inorganic oxide and a water soluble polymer.

In this soft magnetic material powder, since a raw material of the insulating film 2 contains a water soluble polymer together with an inorganic oxide, a thin insulating film 2 can be obtained. Furthermore, since a flexible water soluble polymer is present in the insulating film 2, a stress generated in compression molding can be reduced, and hence, molding can be performed at a low pressure. As a result, even in compression molding for manufacturing of a magnetic core, no cracks are generated in the insulating film 2 of the soft magnetic material particle included in the soft magnetic material powder. That is, according to this soft magnetic material powder, excellent compression moldability can be obtained.

The average particle diameter of the core 1 containing the Fe-based soft magnetic material of the soft magnetic material particle 10, which forms this soft magnetic material powder, is, for example, in a range of 0.1 to 100 μm. The thickness of the insulating film 2 of the soft magnetic material particle 10 is, for example, in a range of 5 to 100 nm and preferably in a range of 20 to 40 nm. The thickness was measured by a transmission electron microscope (TEM). In particular, by the use of a thin sample obtained by processing a magnetic core, the thickness of the insulating film 2 was measured at 5 locations of each of 5 viewing fields of the observation image by a transmission electron microscope at a magnification of 100,000 to 200,000 times, and the average value obtained therefrom was regarded as the thickness of the insulating film 2.

Hereinafter, members forming this soft magnetic material powder will be described.

Fe-Based Soft Magnetic Material: Core

As the Fe-based soft magnetic material used for the core 1, for example, Fe and an alloy containing Fe may be used. As the alloy containing Fe, for example, various Fe-based magnetic metals, such as FeNi, FeCo, FeSi, FeSiCr, FeSiAl, and FeSiBCr, which have been used in the past, may be mentioned. The soft magnetic material may further contain an impurity.

Insulating Film

The insulating film 2 contains an inorganic oxide and a water soluble polymer.

Inorganic Oxide

As a metal element M forming the inorganic oxide, at least one type selected from the group consisting of Li, Na, Mg, Al, Si, K, Ca, Ti, Cu, Sr, Y, Zr, Ba, Ce, Ta, and Bi may be used. In addition, for example, in consideration of the strength and the inherent specific resistance of an oxide to be obtained, Si, Ti, Al, and Zr are preferable. This metal element M is a metal of a metal alkoxide to form the insulating film 2. As a concrete inorganic oxide, $SiO_2$, $TiO_2$, $Al_2O_3$, or ZrO is preferable. $SiO_2$ is particularly preferable.

In addition, the inorganic oxide is contained in a range of 0.01 to 5 percent by weight with respect to the soft magnetic material powder.

Water Soluble Polymer

As the water soluble polymer, at least one selected from the group consisting of a poly(ethylene imine), a poly(vinyl pyrrolidone), a poly(ethylene glycol), a sodium polyacrylate, a carboxymethyl cellulose, a poly(vinyl alcohol), and a gelatin may be used, or at least two types thereof may be used in combination.

The water soluble polymer is contained in a range of 0.01 to 1 percent by weight with respect to the soft magnetic material powder.

Method for Manufacturing Soft Magnetic Material Powder

A method for manufacturing this soft magnetic material powder will be described.

(1) An Fe-based soft magnetic material powder is dispersed in a solvent.
(2) A metal alkoxide and a water soluble polymer are added in the solvent, followed by stirring.

In this step, the metal alkoxide is hydrolyzed. On the surface of each soft magnetic material particle forming the Fe-based soft magnetic material powder, an insulating film containing a metal oxide, which is a hydrolysate of the metal alkoxide, and the water soluble polymer is formed.

By the procedure described above, a soft magnetic material powder including insulation-treated soft magnetic material particles can be obtained.

Hereinafter, a method for manufacturing this soft magnetic material powder will be described.

Fe-Based Soft Magnetic Material

The Fe-based soft magnetic material is the same as described above, and the description thereof is omitted.

Solvent

As the solvent, an alcohol, such as methanol or ethanol, may be used.

Metal Alkoxide

As a metal element M of a metal alkoxide in the form of M-OR to be added, at least one type selected from the group consisting of Li, Na, Mg, Al, Si, K, Ca, Ti, Cu, Sr, Y, Zr, Ba, Ce, Ta, and Bi may be used. In addition, for example, in consideration of the strength and the inherent specific resistance of an oxide to be obtained, Si, Ti, Al, and Zr are preferable.

In addition, as the alkoxy group OR of the metal alkoxide, an arbitrary group, such as a methoxy group, an ethoxy group, or a propoxy group, may be selected.

In addition, at least two types of metal alkoxides may be used in combination.

In order to increase a hydrolysis rate of the metal alkoxide, if needed, there may be added an acidic catalyst, such as hydrochloric acid, acetic acid, or phosphoric acid; a basic catalyst, such as ammonia, sodium hydroxide, or piperidine; or a salt catalyst, such as ammonium carbonate or ammonium acetate.

A dispersion liquid obtained after stirring may be dried by an appropriate method (oven, spray, in vacuo, or the like). A drying temperature may be, for example, in a temperature range of 50° C. to 300° C. A drying time may be appropriately determined. For example, the drying time may be, for example, in a range of 10 minutes to 24 hours.

Powder Magnetic Core

Figure 2:
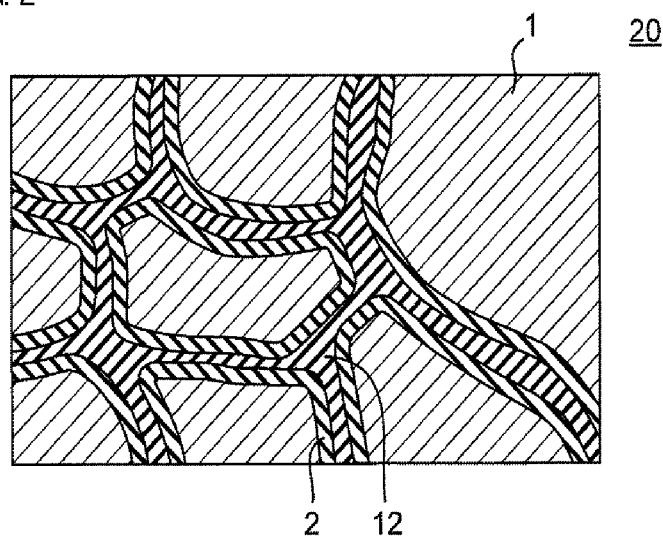
FIG. 2 is an enlarged cross-sectional view showing a fine cross-sectional structure of a magnetic core according to Embodiment 1.

FIG. 2 is an enlarged cross-sectional view showing the structure of a magnetic core (powder magnetic core) 20 according to Embodiment 1. This powder magnetic core 20 is formed to have the structure in which insulating films 2 and a binder 12 surround the peripheries of Fe-based soft magnetic materials 1 derived from the cores of the soft magnetic material particles forming the soft magnetic material powder. This insulating film 2 contains the inorganic oxide and the water soluble polymer, each of which is contained in the insulating film 2 of the soft magnetic material particle 10 included in the soft magnetic material powder. The binder 12 is formed of a binder which is added when a powder magnetic core is manufactured.

In addition, in some cases, depending on the temperature of a heat annealing treatment, some of the functional groups of the water soluble polymer may be lost from the insulating film 2, or the water soluble polymer may be partially or entirely lost by heat decomposition, evaporation, or volatilization thereof.

Since this powder magnetic core 20 is formed using a soft magnetic material powder including the soft magnetic material particles each having the thin insulating film 2, the soft magnetic materials 1 are isolated from each other with the insulating films 2 and the binder 12 provided therebetween. Hence, without generating cracks in the insulating film 2 of the soft magnetic material particle, a high electric resistance can be maintained by the insulating film 2 and the binder 12. As a result, the effect of low eddy-current loss can be obtained. In addition, since the insulating film 2 of the soft magnetic material particle 10 included in the soft magnetic material powder is thin, in the powder magnetic core 20, the thickness of the insulating film 2 can also be decreased. As a result, the density of the soft magnetic material 1 can be increased, and a high magnetic permeability can be obtained.

In addition, this magnetic core may also be used for a coil component or an electronic component, such as an inductor. In this case, in the coil component, as the magnetic core, a member around which a coil-shaped conductor is wound may be mentioned. Alternatively, in the coil component, as the magnetic core, a member in which a coil-shaped conductor is arranged may be mentioned. The coil-shaped conductor may be a wire wound in a coil form or a patterned conductor formed to have a coil shape may be mentioned.

Hereinafter, members forming this powder magnetic core will be described.

Soft Magnetic Material

The soft magnetic material 1 is substantially the same as that of the above Fe-based soft magnetic material, and the description thereof is omitted.

Insulating Film

The insulating film 2 is derived from the insulating film 2 of the soft magnetic material particle 10 included in the soft magnetic material powder. That is, the insulating film 2 contains an inorganic oxide and a water soluble polymer. However, the insulating film 2 of the magnetic core (hereinafter, referred to as "annealed magnetic core" in some cases) formed by heat annealing may contain no water soluble polymer in some cases. In addition, the inorganic oxide contained in the insulating film 2 of the annealed magnetic core may include, besides the oxide of the above metal element M, an oxide of Fe in some cases. In addition, an inorganic oxide contained in the insulating film 2 of an annealed magnetic core which uses an alloy (such as FeSiCr, FeSiBCr, or FeSiAl) containing Fe and Cr or Al as a soft magnetic material may further include, besides the oxide of the metal element M and the oxide of Fe, an oxide of Cr or an oxide of Al in some cases.

Binder The binder 12 is a binder which is added when a powder magnetic core is manufactured. The binder 12 is not particularly limited as long as a thermosetting resin is used, and for example, an epoxy resin, an imide resin, a silicone resin, or a fluorinated resin may be used. Those resins may be used alone, or at least two types thereof may be selectively used in combination. By the insulating film 2 and the binder 12 described above, the soft magnetic materials 1 are isolated from each other.

Method for Manufacturing Powder Magnetic Core

Next, a method for manufacturing a powder magnetic core will be described.

(1) After the insulation-treated soft magnetic material powder thus obtained is washed with ethanol and is then mixed with a thermosetting resin functioning as the binder, compression molding is performed, and subsequently, the thermosetting resin is cured by heating. The temperature of the heat curing may be 10° C. to less than 400° C. In addition, after the soft magnetic material powder and the binder are mixed together, granulation may be performed. Although the thermosetting resin used as the binder is not particularly limited, for example, there may be mentioned an epoxy resin, an imide resin, a silicone resin, or a fluorinated resin. One type of those resins or a combination between at least two types thereof may be selected. A curing agent curing the thermosetting resin is not particularly limited, and for example, a phenol resin, a polyamine, or an imidazole may be used. The binder may be added in a range of 1 to 6 percent by weight with respect to 100 percent by weight of the powder magnetic core. In addition, in order to increase the strength of the powder magnetic core, a glass frit or a silane coupling agent may also be used. Furthermore, in compression molding, a die may also be used. By performing the compression molding, the density of the soft magnetic material can be increased. In addition, the compression molding is not essential and may be performed if needed. A magnetic core obtained by performing the compression molding is called a powder magnetic core. On the other hand, a magnetic core obtained without performing the compression molding is simply called a magnetic core. In this embodiment, the "magnetic core" widely includes all types of magnetic cores regardless of whether the compression molding is performed or not.

(2) As for the powder magnetic core, in order to decrease the magnetic core loss, a heat annealing treatment may be performed on a heat-cured powder magnetic core. Since the magnetic core loss depends on the frequency, the annealing treatment may be omitted in accordance with a frequency band to be used for the powder magnetic core. The annealing treatment may be performed on the powder magnetic core at a temperature of 400° C. or more, if needed. In particular, as for the annealing treatment, a heat treatment may be performed, for example, in a temperature range of 400° C. to 900° C. or furthermore in a temperature range of 600° C. to 900° C. in the air, a $N_2$ atmosphere, or a $N_2+H_2$ atmosphere. As the binder used when the heat annealing treatment is performed, a silicone resin is preferable.

As described above, the magnetic core can be obtained. A magnetic core obtained by performing an annealing treatment at 400° C. or more is called, for example, an annealed magnetic core. On the other hand, a magnetic core which is not processed by an annealing treatment is called, for example, a heat-cured magnetic core.

According to this method for manufacturing a powder magnetic core, as described above, there is used a soft magnetic material powder comprising the soft magnetic material particles each including the core 1 which contains an Fe-based soft magnetic material and the insulating film 2 which covers the surface of the core 1 and which contains an inorganic oxide and a water soluble polymer. Since a flexible water soluble polymer is present in the insulating film 2 of the soft magnetic material particle 10, the stress generated in compression molding can be reduced, and hence, molding can be performed at a low pressure. As a result, even in powder compaction molding for manufacturing a powder magnetic core, cracks are not generated in the insulating film 2 of the soft magnetic material particle 10 included in the soft magnetic material powder, and the insulating film 2 and the binder 12 are not broken. As a result, in this powder magnetic core, a high electric resistance can be realized, and the effect of low eddy-current loss can be obtained.

Hereinafter, with reference to Tables 1 and 2, Examples 1 to 19 and Comparative Examples 1 to 3 will be described.

Manufacturing conditions of soft magnetic material powders and powder magnetic cores are shown in Table 1, and the measurement values and the evaluation results are shown in Table 2.

TABLE 1

|  | Magnetic Material | Inorganic Oxide | | | Water Soluble Polymer | | Molding Pressure (t/cm$^2$) | Warm Molding | Annealing Treatment (° C.) |
|---|---|---|---|---|---|---|---|---|---|
|  |  | Raw Material | Product | Blending Amount (wt %) | Name | Blending Amount (wt %) | | | |
| Example 1 | FeSiCr | Tetraethyl Orthosilicate | SiO$_2$ | 1 | Poly(vinyl pyrrolidone) | 0.1 | 4 | No | 720 |
| Example 2 | FeSiCr | Tetraethyl Orthosilicate | SiO$_2$ | 0.01 | Poly(vinyl pyrrolidone) | 0.1 | 4 | No | 720 |

TABLE 1-continued

| | Magnetic Material | Inorganic Oxide | | | Water Soluble Polymer | | Molding Pressure (t/cm$^2$) | Warm Molding | Annealing Treatment (° C.) |
|---|---|---|---|---|---|---|---|---|---|
| | | Raw Material | Product | Blending Amount (wt %) | Name | Blending Amount (wt %) | | | |
| Example 3 | FeSiCr | Tetraethyl Orthosilicate | SiO$_2$ | 5 | Poly(vinyl pyrrolidone) | 0.1 | 4 | No | 720 |
| Example 4 | FeSiCr | Tetraethyl Orthosilicate | SiO$_2$ | 1 | Poly(vinyl pyrrolidone) | 0.01 | 4 | No | 720 |
| Example 5 | FeSiCr | Tetraethyl Orthosilicate | SiO$_2$ | 1 | Poly(vinyl pyrrolidone) | 1 | 4 | No | 720 |
| Example 6 | FeSiCr | Tetraethyl Orthosilicate | SiO$_2$ | 1 | Poly(ethylene imine) | 0.1 | 4 | No | 720 |
| Example 7 | FeSiCr | Tetraethyl Orthosilicate | SiO$_2$ | 1 | Carboxymethyl Cellulose | 0.1 | 4 | No | 720 |
| Example 8 | FeSiCr | Tetraethyl Orthosilicate | SiO$_2$ | 1 | Gelatin | 0.1 | 4 | No | 720 |
| Example 9 | FeSiCr | Tetraethyl Orthosilicate | SiO$_2$ | 1 | Poly(acrylic acid) | 0.1 | 4 | No | 720 |
| Example 10 | FeSiCr | Tetraethyl Orthosilicate | SiO$_2$ | 1 | Poly(ethylene glycol) | 0.1 | 4 | No | 720 |
| Example 11 | FeSiCr | Tetraethyl Orthosilicate | SiO$_2$ | 1 | Poly(vinyl alcohol) | 0.1 | 4 | No | 720 |
| Example 12 | FeSiCr | Aluminum Isopropoxide | Al$_2$O$_3$ | 1 | Poly(vinyl pyrrolidone) | 0.1 | 4 | No | 720 |
| Example 13 | FeSiCr | Titanium Tetraisopropoxide | TiO$_2$ | 1 | Poly(vinyl pyrrolidone) | 0.1 | 4 | No | 720 |
| Example 14 | FeSiCr | Zirconium-n-Butoxide | ZrO | 1 | Poly(vinyl pyrrolidone) | 0.1 | 4 | No | 720 |
| Example 15 | FeSiCr | Tetraethyl Orthosilicate | SiO$_2$ | 1 | Poly(vinyl pyrrolidone) | 0.1 | 4 | No | No |
| Example 16 | FeSiCr | Tetraethyl Orthosilicate | SiO$_2$ | 0.01 | Poly(vinyl pyrrolidone) | 0.1 | 4 | No | No |
| Example 17 | FeSiCr | Tetraethyl Orthosilicate | SiO$_2$ | 5 | Poly(vinyl pyrrolidone) | 0.1 | 4 | No | No |
| Example 18 | FeSiCr | Tetraethyl Orthosilicate | SiO$_2$ | 1 | Poly(vinyl pyrrolidone) | 0.01 | 4 | No | No |
| Example 19 | FeSiCr | Tetraethyl Orthosilicate | SiO$_2$ | 1 | Poly(vinyl pyrrolidone) | 1 | 4 | No | No |
| Comparative Example 1 | FeSiCr | — | — | 0 | — | 0 | 8 | Yes | 720 |
| Comparative Example 2 | FeSiCr | Tetraethyl Orthosilicate | SiO$_2$ | 1 | — | 0 | 4 | No | 720 |

TABLE 2

| | 1 MHz Specific Magnetic Permeability | Specific Resistance (Ω · cm) | Evaluation |
|---|---|---|---|
| Example 1 | 39 | $6.0 \times 10^{11}$ | ○ |
| Example 2 | 39 | $1.0 \times 10^{11}$ | ○ |
| Example 3 | 39 | $3.5 \times 10^{11}$ | ○ |
| Example 4 | 37 | $1.8 \times 10^{11}$ | ○ |
| Example 5 | 33 | $4.3 \times 10^{11}$ | ○ |
| Example 6 | 35 | $3.9 \times 10^{11}$ | ○ |
| Example 7 | 36 | $4.5 \times 10^{11}$ | ○ |
| Example 8 | 38 | $3.4 \times 10^{11}$ | ○ |
| Example 9 | 36 | $5.4 \times 10^{11}$ | ○ |
| Example 10 | 35 | $3.0 \times 10^{11}$ | ○ |
| Example 11 | 37 | $3.4 \times 10^{11}$ | ○ |
| Example 12 | 37 | $6.4 \times 10^{11}$ | ○ |
| Example 13 | 38 | $4.2 \times 10^{11}$ | ○ |
| Example 14 | 36 | $7.4 \times 10^{11}$ | ○ |
| Example 15 | 30 | $6.0 \times 10^{13}$ | ○ |
| Example 16 | 31 | $5.0 \times 10^{13}$ | ○ |
| Example 17 | 30 | $4.8 \times 10^{13}$ | ○ |
| Example 18 | 31 | $1.9 \times 10^{13}$ | ○ |
| Example 19 | 30 | $3.8 \times 10^{13}$ | ○ |
| Comparative Example 1 | 39 | $1.5 \times 10^{5}$ | x |
| Comparative Example 2 | 20 | $4.2 \times 10^{7}$ | x |

Example 1

Insulating Treatment of Soft Magnetic Material Powder

A method for manufacturing a soft magnetic material powder according to Example 1 will be described.

(a) In 37.2 g of ethanol, 20 g of a FeSiCr powder having an average particle diameter of 30 μm was added as a soft magnetic material.

(b) Next, 1 percent by weight of tetraethyl orthosilicate was weighed on a SiO$_2$ basis with respect to 100 percent by weight of the Fe-based soft magnetic material and was then added to and stirred with the ethanol to which the FeSiCr powder was added.

(c) Furthermore, a poly(vinyl pyrrolidone) was weighed so as to have a concentration of 0.1 percent by weight with respect to 100 percent by weight of the Fe-based soft magnetic material, was dissolved in 3.2 g of purified water, and was then dripped to the ethanol to which the FeSiCr powder was added. Stirring and mixing were performed over 60 minutes.

Accordingly, an insulation-treated soft magnetic material powder (on which an insulating film was formed) was obtained.

Formation and Quality Confirmation of Powder Magnetic Core Using Soft Magnetic Material Powder Next, the formation of a powder magnetic core using the insulation-treated soft magnetic material powder thus obtained will be described.

(1) After 500 g of the insulation-treated soft magnetic material powder thus obtained and 20.9 g of a silicone resin functioning as a binder were mixed together, toroidal rings each having an inside diameter of 4 mm, an outside diameter of 9 mm, and a thickness of 1 mm were formed at a pressure of 4 t/cm$^2$. In addition, at a pressure of 4 t/cm$^2$, test pieces each having a size of 3 mm×3 mm×1 mm were formed.
(2) Next, the toroidal rings and the test pieces were heated at 200° C. for 1 hour (curing treatment).
(3) Furthermore, some toroidal rings and test pieces were heated at 720° C. for 50 minutes in an air atmosphere (heat annealing treatment).
(4) Subsequently, the magnetic permeability of the toroidal ring was measured at 1 MHz using a RF impedance analyzer (Agilent E4991A). In addition, by a high resistance measurement device (Advantest R8340A ULTRA HIGH RESISTANCE METER), a voltage of 900 V was applied for 5 seconds between two points of the test piece having a gap of 3 mm, and the specific resistance was measured.

When the specific magnetic permeability obtained from the measured magnetic permeability was 30 or more, and when the specific resistance was 10$^8$ Ω·cm or more, the evaluation result was represented by ○ (accepted), and when at least one of them was less than the value described above, the evaluation result was represented by x (rejected).

Figure 3:
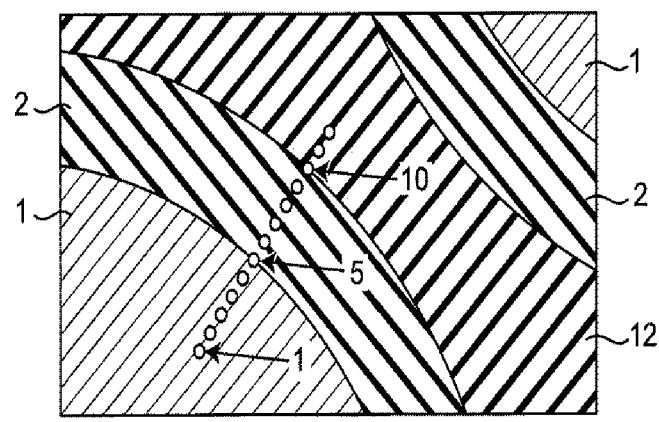
FIG. 3 is a schematic view showing analytical positions at each of which a composition analysis is performed, the analytical positions being located on the line extending from a core to an insulating film and a binder of a soft magnetic material particle which forms the cross-sectional structure of the magnetic core shown in FIG. 2.
Figure 4:
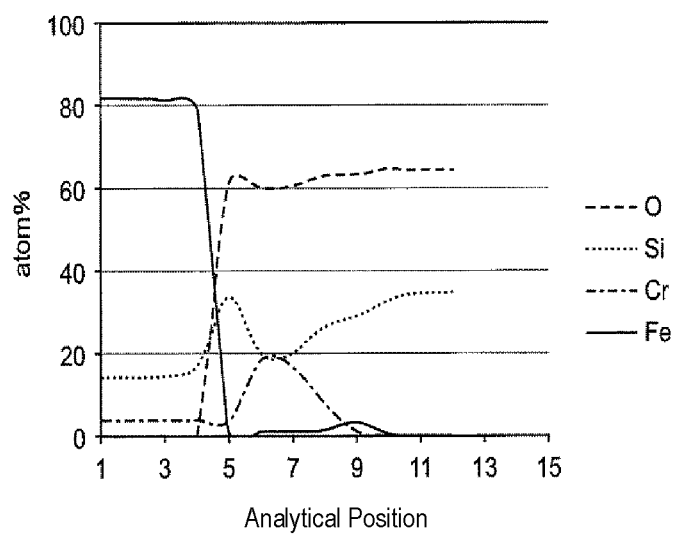
FIG. 4 is a graph showing composition analysis results obtained along the line shown in FIG. 3.
Figure 5:
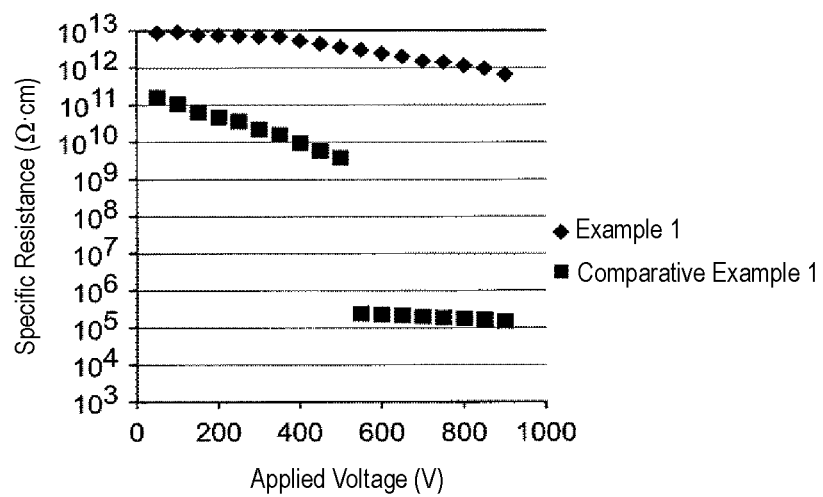
FIG. 5 is a graph showing the relationship between an applied voltage and a specific resistance measured by a high resistance measurement device.

FIG. 3 is a schematic view showing analytical positions at each of which a composition analysis is performed, the analytical positions being located on the line extending from the core to the insulating film and the binder of the soft magnetic material particle which forms the cross-sectional structure of the magnetic core shown in FIG. 2. FIG. 4 is a graph showing the composition analysis results obtained along the line shown in FIG. 3. The composition analysis of the cross-sectional structure of the magnetic core was performed as described below. First, a surface of the test piece processed by a heat annealing treatment, the surface being perpendicular to a side of the test piece having the smallest length, was polished until the length of the side having the smallest length is decreased to one-half, so that the cross-sectional surface was formed. Subsequently, line analysis of the cross-sectional surface was performed by TEM-EDS on each of the analytical positions on the line shown in FIG. 3, so that the elements present in the core 1, the insulating film 2, and the binder 12 on the line were analyzed.
Withstand Voltage Test FIG. 5 is a graph showing the relationship between the specific resistance measured by the above high resistance measurement device and the applied voltage. In Examples 1 and 2, even when a voltage of 900 V was applied, IR (insulating resistance) was not decreased. On the other hand, in Comparative Example 1, when a voltage of 900 V was applied, IR (insulating resistance) was decreased.

From this test, it was found that in Examples 1 and 2 according to the present disclosure, a magnetic core having a high withstand voltage capable of withstanding an application voltage of 900 V could be provided.
Operation and Effect As shown in Table 2, from the soft magnetic material powder according to Example 1, the powder magnetic core could be formed at a low molding pressure (4 t/cm$^2$). The powder magnetic core thus obtained had a high specific magnetic permeability (39), and even after the heat annealing treatment was performed, the specific resistance was high (6.0×10$^{11}$ Ω·cm). In addition, from the results obtained from the line analysis shown in FIG. 4, in the soft magnetic material powder according to Example 1, the amount of Si in the obtained insulating film 2 was larger than that of Cr therein. The soft magnetic material powder according to Example 1 includes the core 1 which is formed from an Fe-based soft magnetic material and which contains Cr and the insulating film 2 which covers the surface of the core 1 and which contains Si. Furthermore, in the insulating film 2, an inorganic oxide in which the amount of Si is larger than that of Cr is contained.

From this analysis result, in comparison between Example 1 and Comparative Example 1, it is believed that since a large amount of Si is contained in the insulating film 2 as compared to that of Cr, a magnetic core having a high withstand voltage can be obtained.

Examples 2 and 3

Except that as shown in Table 1, the addition amount of the tetraethyl orthosilicate used as the metal alkoxide was changed (Example 2: 0.01 percent by weight, Example 3: 5 percent by weight), a soft magnetic material powder and a powder magnetic core were formed in a manner similar to that of Example 1, and the measurement and the evaluation were performed.
Operation and Effect As shown in Table 2, as was the case of Example 1, the powder magnetic core could be formed at a low molding pressure (4 t/cm$^2$). In addition, the powder magnetic core thus obtained had a high specific magnetic permeability (Example 2: 39, Example 3: 39), and even after the heat annealing treatment was performed, the specific resistance was high (Example 2: 1.0×10$^{11}$ Ω·cm, Example 3: 3.5×10$^{11}$ Ω·cm).

Examples 4 and 5

Except that as shown in Table 1, the addition amount of the poly(vinyl pyrrolidone) used as the water soluble polymer was changed (Example 4: 0.01 percent by weight, Example 5: 1 percent by weight), a soft magnetic material powder and a powder magnetic core were formed in a manner similar to that of Example 1, and the measurement and the evaluation were performed.
Operation and Effect As shown in Table 2, as was the case of Example 1, the powder magnetic core could be formed at a low molding pressure (4 t/cm$^2$). In addition, the powder magnetic core thus obtained had a high specific magnetic permeability (Example 4: 37, Example 5: 33), and even after the heat annealing treatment was performed, the specific resistance was high (Example 4: 1.8×10$^{11}$ Ω·cm, Example 5: 4.3×10$^{11}$ Ω·cm).

Examples 6 to 11

Except that as shown in Table 1, the type of water soluble polymer to be used was changed (Example 6: poly(ethylene imine), Example 7: carboxymethyl cellulose, Example 8: gelatin, Example 9: poly (acrylic acid), Example 10: poly (ethylene glycol), Example 11: poly(vinyl alcohol)), a soft magnetic material powder and a powder magnetic core were formed in a manner similar to that of Example 1, and the measurement and the evaluation were performed.
Operation and Effect As shown in Table 2, as was the case of Example 1, the powder magnetic core could be formed at a low molding pressure (4 t/cm$^2$). In addition, the powder magnetic core thus obtained had a high specific magnetic permeability (Example 6: 35, Example 7: 36, Example 8: 38, Example 9:

36, Example 10: 35, Example 11: 37), and even after the heat annealing treatment was performed, the specific resistance was high (Example 6: 3.9×10$^{11}$ Ω·cm, Example 7: 4.5×10$^{11}$ Ω·cm, Example 8: 3.4×10$^{11}$ Ω·cm, Example 9: 5.4×10$^{11}$ Ω·cm, Example 10: 3.0×10$^{11}$ Ω·cm, Example 11: 3.4×10$^{11}$ Ω·cm).

Examples 12 to 14

Except that as shown in Table 1, the type of metal alkoxide to be used was changed (Example 12: aluminum isopropoxide, Example 13: titanium tetraisopropoxide, Example 14: zirconium-n-butoxide), a soft magnetic material powder and a powder magnetic core were formed in a manner similar to that of Example 1, and the measurement and the evaluation were performed.
Operation and Effect
As shown in Table 2, as was the case of Example 1, the powder magnetic core could be formed at a low molding pressure (4 t/cm$^2$). In addition, the powder magnetic core thus obtained had a high specific magnetic permeability (Example 12: 37, Example 13: 38, Example 14: 36), and even after the heat annealing treatment was performed, the specific resistance was high (Example 12: 6.4×10$^{11}$ Ω·cm, Example 13: 4.2×10$^{11}$ Ω·cm, Example 14: 7.4×10$^{11}$ Ω·cm).

Example 15

Except that as shown in Table 1, the heat annealing treatment was not performed, a soft magnetic material powder and a powder magnetic core were formed in a manner similar to that of Example 1, and the measurement and the evaluation were performed.
Operation and Effect
As shown in Table 2, according to the powder magnetic core of Example 15, the formation thereof could be formed at a low molding pressure, and although the heat annealing treatment was not performed, a high specific magnetic permeability (30) and a high specific resistance (6.0×10$^{13}$ Ω·cm) could be obtained.

Examples 16 and 17

Except that as shown in Table 1, the addition amount of the tetraethyl orthosilicate used as the metal alkoxide was changed (Example 16: 0.01 percent by weight, Example 17: 5 percent by weight), a soft magnetic material powder and a powder magnetic core were formed in a manner similar to that of Example 15, and the measurement and the evaluation were performed.
Operation and Effect
As shown in Table 2, as was the case of Example 15, the powder magnetic core could be formed at a low molding pressure, and although the heat annealing treatment was not performed, a high specific magnetic permeability (Example 16: 31, Example 17: 30) and a high specific resistance (Example 16: 5.0×10$^{13}$ Ω·cm, Example 17: 4.8×10$^{13}$ Ω·cm) could be obtained.

Examples 18 and 19

Except that as shown in Table 1, the addition amount of the poly(vinyl pyrrolidone) used as the water soluble polymer was changed (Example 18: 0.01 percent by weight, Example 19: 1 percent by weight), a soft magnetic material powder and a powder magnetic core were formed in a manner similar to that of Example 15, and the measurement and the evaluation were performed.
Operation and Effect
As shown in Table 2, as was the case of Example 15, the powder magnetic core could be formed at a low molding pressure, and although the heat annealing treatment was not performed, a high specific magnetic permeability (Example 18: 31, Example 19: 30) and a high specific resistance (Example 18: 1.9×10$^{13}$ Ω·cm, Example 19: 3.8×10$^{13}$ Ω·cm) could be obtained.

Comparative Examples 1 and 2

As shown in Table 1, in Comparative Example 1, by the use of a magnetic powder which was not processed by an insulating treatment, granulation was formed in a manner similar to that of Example 1, and a powder magnetic core was then formed at a molding pressure of 8 t/cm$^2$ while heating was performed at 150° C.
In Comparative Example 2, except that the poly(vinyl pyrrolidone) functioning as the water soluble polymer was not added, a soft magnetic material powder and a powder magnetic core were formed in a manner similar to that of Example 1.
Operation and Effect
As shown in Tables 1 and 2, according to Comparative Example 1, although a powder magnetic core having a high specific magnetic permeability (39) could be obtained, a high molding pressure (8 t/cm$^2$) and warm molding were required, and since the insulating treatment of the soft magnetic material powder was not performed, the specific resistance after the heat annealing treatment was decreased (1.5×10$^5$ Ω·cm).
In Comparative Example 2, a powder magnetic core having a relatively low specific magnetic permeability (20) was only obtained. In addition, in the pressure molding, fine cracks were generated in the insulating film, and the specific resistance was decreased (4.2×10$^7$ Ω·cm).
In addition, in the above examples, although FeSiCr was used as the magnetic material, the magnetic material is not limited thereto, and another Fe-based soft magnetic material may also be used. In addition, the temperature of the heat annealing treatment is not limited to 720° C., and the heat annealing treatment may be performed when the temperature is set in a range of 400° C. to 900° C. and furthermore in a range of 600° C. to 900° C.
In addition, in the present disclosure, the various embodiments described above may be arbitrarily used in combination, and the advantages of the individual embodiments may also be obtained.
Industrial Applicability
According to the soft magnetic material powder of the present disclosure, as the soft magnetic material, a sufficient density and a high magnetic permeability can be obtained, and furthermore, a magnetic core having a high electric resistance and a high withstand voltage can also be obtained by the insulating films and the binder of the soft magnetic material particles included in the soft magnetic material powder, and hence, the above soft magnetic material powder is effectively used as a soft magnetic material powder for magnetic cores.

The invention claimed is:
1. A soft magnetic material powder comprising:
soft magnetic material particles,
wherein the soft magnetic material particles each include:
a core containing an Fe-based soft magnetic material;
an insulating film covers the surface of the core, the insulating film contains an inorganic oxide and a water soluble polymer, and the inorganic oxide and water soluble polymer are formed in the same film layer.

2. The soft magnetic material powder according to claim 1, wherein the water soluble polymer is at least one selected from the group consisting of a poly(vinyl pyrrolidone), a poly(ethylene imine), a carboxymethyl cellulose, a gelatin, a poly(acrylic acid), a poly(ethylene glycol), and a poly(vinyl alcohol).

3. The soft magnetic material powder according to claim 1, wherein the water soluble polymer is a poly(vinyl pyrrolidone) and is contained in a range of 0.01 to 1 percent by weight with respect to 100 percent by weight of the Fe-based soft magnetic material.

4. The soft magnetic material powder according to claim 1, wherein the inorganic oxide is at least one selected from the group consisting of $TiO_2$, $SiO_2$, $Al_2O_3$, and ZrO.

5. The soft magnetic material powder according to claim 1, wherein the inorganic oxide is $SiO_2$ and is contained in a range of 0.01 to 5 percent by weight with respect to 100 percent by weight of the Fe-based soft magnetic material.

6. The soft magnetic material powder according to claim 1, wherein the Fe-based soft magnetic material is at least one selected from the group consisting of Fe, FeNi, FeCo, FeSi, FeSiCr, FeSiAl, and FeSiBCr.

7. A magnetic core comprising the soft magnetic material powder according to claim 1.

8. A magnetic core comprising:

soft magnetic material particles; and a binder which bonds the soft magnetic material particles to each other, wherein the soft magnetic material particles each include:

a core containing an Fe-based soft magnetic material;

an insulating film covers the surface of the core, the insulating film contains an inorganic oxide and a water soluble polymer, and the inorganic oxide and water soluble polymer are formed in the same film layer.

9. A magnetic core comprising:

soft magnetic material particles; and a binder which bonds the soft magnetic material particles to each other, wherein the soft magnetic material particles each include:

a core formed from an Fe-based soft magnetic material; and a Si-containing insulating film covering the surface of the core, the Fe-based soft magnetic material includes Fe and Cr, and the insulating film contains an inorganic oxide in which the amount of Si is larger than that of Cr.

10. A method for manufacturing a magnetic core, the method comprising:

mixing the soft magnetic material powder according to claim 1 and a thermosetting resin functioning as a binder to form a mixture; and heat-curing the thermosetting resin of the mixture to obtain a magnetic core.

11. A method for manufacturing a magnetic core, the method comprising:

mixing the soft magnetic material powder according to claim 1 and a thermosetting resin functioning as a binder to form a mixture; and after the thermosetting resin is cured by heating the mixture, performing an annealing treatment to obtain a magnetic core.

12. An electronic component comprising the magnetic core according to claim 7.

* * * * *